(No Model.)  2 Sheets—Sheet 1.

J. H. RAY.
TRICYCLE.

No. 288,114.  Patented Nov. 6, 1883.

Attest:
Herbert Knight
Wm. J. Sayers

Inventor:
Jas. H. Ray
By Knight Bros
Attys.

(No Model.)  2 Sheets—Sheet 2.
J. H. RAY.
TRICYCLE.
No. 288,114.  Patented Nov. 6, 1883.
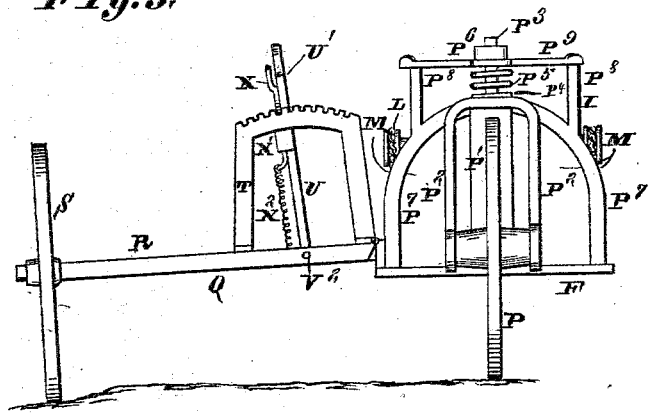
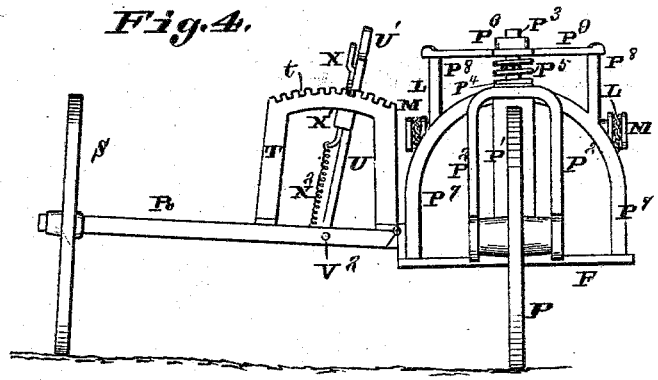
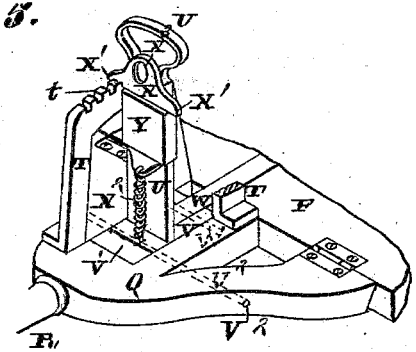
Attest:
Herbert Knight
Wm. J. Sayers
Inventor:
Jas. H. Ray
By Knight Bros
Attys

UNITED STATES PATENT OFFICE.

JAMES H. RAY, OF ST. LOUIS, MISSOURI.

TRICYCLE.

SPECIFICATION forming part of Letters Patent No. 288,114, dated November 6, 1883.

Application filed February 12, 1883. (No model.)

*To all whom it may concern:*

Be it known that I, JAMES H. RAY, of the city of St. Louis, in the State of Missouri, have invented a certain new and useful Improvement in Tricycles, of which the following is a full, clear, and exact description, reference being had to the accompanying drawings, forming part of this specification, and in which—

Figure 1:
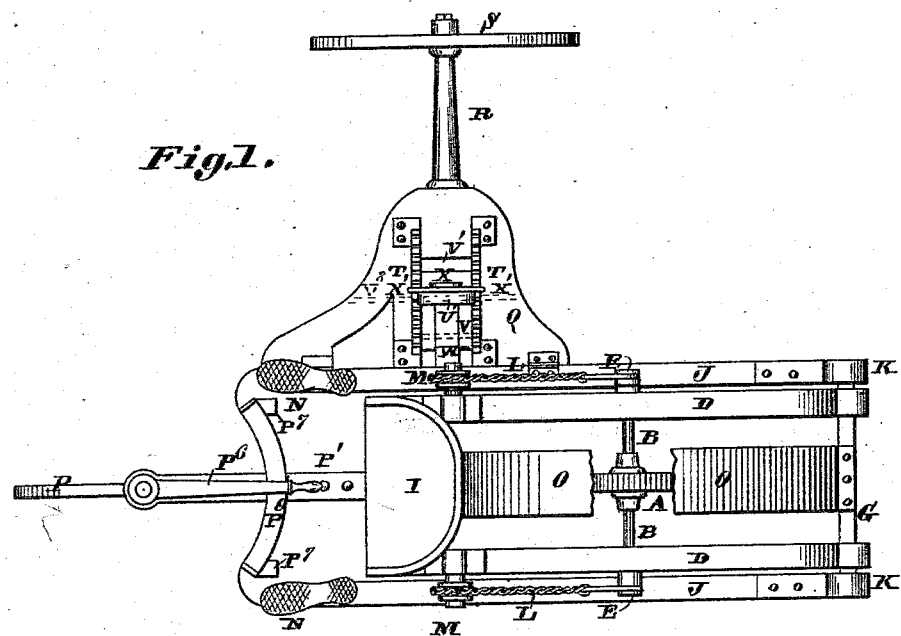
Figure 2:
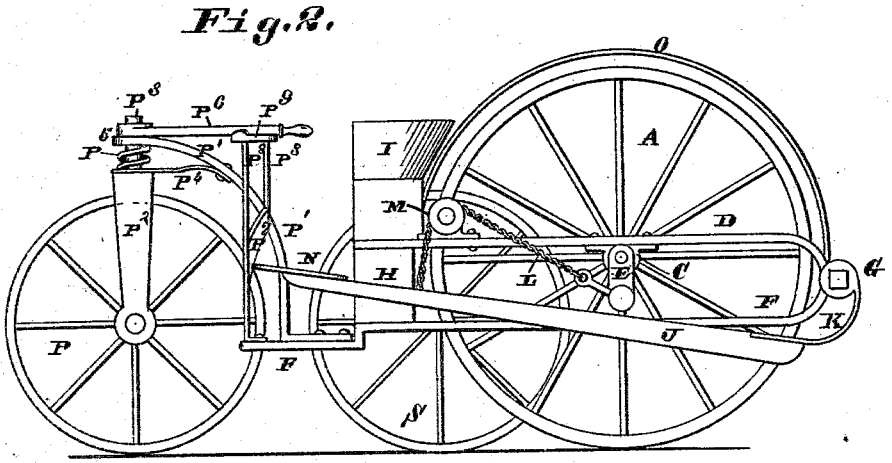

Figure 1 is a top view. Fig. 2 is a side elevation. Fig. 3 is a front view. Fig. 4 is a similar view, and Fig. 5 is a detail perspective view.

My invention relates to a means whereby the rider can keep himself in a vertical position at all times, whether the side wheel is lower or higher than the driver; and my invention consists in points of novelty hereinafter fully described and claimed.

Referring to the drawings, A represents the main or drive wheel, rigidly secured to its axle or gudgeons B, journaled in boxes C, secured to a frame, D, and having cranks E on their outer ends. The frame D is supported by a lower frame, F, the connection at the rear being made by a suitable connecting-strip, G, the ends of the two frames being bent so as to come together, (see Fig. 2,) and the connection at the front end being made by a block, H, (see same figure,) and above the block H, on the frame D, is the rider's seat I.

Secured to the rear parts of the frame are foot-levers J, the connection preferably being made by thin metallic plates K, which will allow the forward ends to have free vertical movements. The levers are connected, near their forward ends, to the cranks E of the driving-wheel by suitable ropes or chains, L, passing over grooved friction-rollers M, journaled to the upper frame, D, and on the extreme forward ends of the foot-levers or pedals are foot-pieces N. The cranks E are at right angles to each other, and thus it will be seen that as they are alternately raised and lowered they will turn the driving-wheel.

O represents a guard over the wheel A, secured to and supported by the frame D.

P represents the guide-wheel in front of the main wheel, and secured to the frame F by a curved arm, P', and a yoke, P², extending up from the axle of the wheel, the yoke having a stem, P³, that passes through a hole in the end of the arm, and also through a hole in a thin plate, P⁴, secured to the arm. Between this plate and the arm is a spiral spring, P⁵, acting to give the spring to the vehicle.

P⁶ represents a lever secured to the stem P³ of the yoke, above the arm P', by which the wheel can be turned to guide the vehicle. The arm P' is strengthened by braces P⁷, connecting it with the frame F; and P⁸ are vertical projections of the braces P⁷ and the arm P', to the upper ends of which is secured a plate, P⁹, which forms a rest for the free end of the lever P⁶. (See Fig. 1.)

I will now describe the manner of connecting and adjusting the side wheel, to which my invention principally relates.

Q represents a frame, hinged to that F by suitable joints. On the outer end of this frame is an arm, R, to or on which is journaled the side wheel, S. The frame Q is so hinged to that F that its outer end can be raised or lowered from a horizontal plane relative to the frames F and D, or, in other words, the latter frames can be kept in a horizontal position at all times, whatever may be the elevation of the side wheel, (see Figs. 3 and 4,) and the two frames are held in these different positions by the following means, viz:

T represents two plates (one of them being broken away in Fig. 5) supported by and secured to the frame Q, and having notched tops, as shown. Between the plates is a lever, U, with a handle, U', on its upper end, secured by its lower end to a block, V, pivoted in a slot, V', of the frame Q by a bolt or rod, V². The pin or rod V² passes through the outer end of the block, and its inner end is pivoted to the outer end of a stationary arm, W, by a bolt or pin, W', (see dotted lines, Fig. 5,) secured to the frame F.

It will thus be seen that as the rider moves the upper end of the lever U toward or away from him the relative positions of the frames will be changed, and he can in this way keep himself always in a vertical position, whether the side wheel is on a lower or higher elevation than the other wheels. The lever is held to any adjustment by a plate, X, working in a keeper, Y, secured to the lever. The plate has projections X', which engage with the notches $t$ of the plates T, and it is held down by a spiral spring, $X^2$. The top of the plate has a hole or perforation, $X^3$, into which the rider can put one finger to raise the plate out of engagement with the plates T, to allow the lever to be operated, and then, by releasing the plate X, it will drop into the notches, holding the lever to its adjustment.

I claim as my invention—

1. In a tricycle, the combination, with the main frame, of the side-wheel frame, hinged to the side of the main frame, plates T T, having notches $t$, lever U, pivoted to the side-wheel frame, and holding-plate X, having projections $X'$, as set forth.

2. In a tricycle, the combination of frame F of the main wheel, frame Q of the side wheel, the two being hinged together, block V, pivoted to the frame Q, arm W, secured to the frame F and pivoted to the block V, lever U, secured to the block V, plate X $X'$, working in keeper Y of the frame, spring $X^2$, for holding the plate down, and notched plates T, secured to the frame, all substantially as shown and described, for the purpose set forth.

3. In a tricycle, the combination of main wheel A, having gudgeons B, with cranks E, frame D, to which the wheel is secured by suitable boxes, C, frame F, supporting the frame D, foot-levers J, secured to the frames D F and to the cranks E by chains L, passing over pulleys or wheels M, and guide-wheel P, with suitable means of directing it, all substantially as shown and described, for the purpose set forth.

JAMES H. RAY.

Witnesses:
SAML. KNIGHT,
GEO. H. KNIGHT.